(12) United States Patent
Dunne et al.

(10) Patent No.: US 12,203,446 B2
(45) Date of Patent: Jan. 21, 2025

(54) CONTROLLING A WIND TURBINE USING BLADE PITCH ANGLE SETTING AND BLADE ADD-ON SETTING

(71) Applicant: Siemens Gamesa Renewable Energy A/S, Brande (DK)

(72) Inventors: Fiona Dunne, København NV (DK); Thomas Esbensen, Herning (DK); Gustav Hoegh, Vejle (DK); Kirk Pierce, Lafayette, CO (US); Brian Willum Solberg, Brønshøj (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 17/910,387

(22) PCT Filed: Mar. 3, 2021

(86) PCT No.: PCT/EP2021/055271
§ 371 (c)(1),
(2) Date: Sep. 9, 2022

(87) PCT Pub. No.: WO2021/185577
PCT Pub. Date: Sep. 23, 2021

(65) Prior Publication Data
US 2023/0151798 A1    May 18, 2023

(30) Foreign Application Priority Data

Mar. 17, 2020    (EP) .................................... 20163496

(51) Int. Cl.
*F03D 7/02*    (2006.01)
*F03D 7/04*    (2006.01)

(52) U.S. Cl.
CPC ......... *F03D 7/0224* (2013.01); *F03D 7/0232* (2013.01); *F03D 7/024* (2013.01);
(Continued)

(58) Field of Classification Search
CPC ...... F03D 7/0224; F03D 7/0232; F03D 7/024; F03D 7/0276; F03D 7/043;
(Continued)

(56) References Cited

U.S. PATENT DOCUMENTS 9,062,656 B2 * 6/2015 Brath .................... F03D 7/0276
9,556,850 B2 * 1/2017 Goodman ............. F03D 7/0224
(Continued)

FOREIGN PATENT DOCUMENTS

EP    3290688 A1    3/2018

OTHER PUBLICATIONS

Matthew A. Lackner et al: "A comparison of smart rotor control approaches using trailing edge flaps and individual pitch control", Wind Energy, vol. 13, No. 2-3, Mar. 1, 2010 (Mar. 1, 2010), pp. 117-134, XP055024490, ISSN: 1095-4244, DOI: 10.1002/we.353. the whole document.
(Continued)

Primary Examiner — Brian P Wolcott
(74) Attorney, Agent, or Firm — Schmeiser, Olsen & Watts LLP (57) ABSTRACT

A method of controlling a wind turbine by adjusting a blade pitch angle and at least one blade add-on of at least one wind turbine rotor blade has the blade add-on, the method including: adjusting a setting of the add-on to meet a control objective while temporarily maintaining a setting of the blade pitch angle.

15 Claims, 8 Drawing Sheets

(52) U.S. Cl.
CPC ........... *F03D 7/0276* (2013.01); *F03D 7/043* (2013.01); *F05B 2240/3052* (2020.08); *F05B 2270/101* (2013.01); *F05B 2270/327* (2013.01)

(58) Field of Classification Search
CPC ........ F05B 2240/3052; F05B 2270/101; F05B 2270/327
See application file for complete search history.

(56) References Cited

U.S. PATENT DOCUMENTS

| | | | |
|---|---|---|---|
| 9,926,911 B2 * | 3/2018 | Butterworth | F03D 7/044 |
| 10,385,826 B2 * | 8/2019 | Butterworth | F03D 7/022 |
| 10,570,881 B2 * | 2/2020 | Egedal | F03D 7/0228 |
| 2018/0058424 A1 * | 3/2018 | Egedal | F03D 7/0224 |
| 2019/0368467 A1 * | 12/2019 | Christensen | F03D 1/06 |

OTHER PUBLICATIONS

PCT International Search Report and Written Opinion of International Searching Authority mailed Jun. 11, 2021 corresponding to PCT International Application No. PCT/EP2021/055271 filed Mar. 3, 2021.

* cited by examiner

CONTROLLING A WIND TURBINE USING BLADE PITCH ANGLE SETTING AND BLADE ADD-ON SETTING

CROSS-REFERENCE TO RELATED APPLICATIONS

This application claims priority to PCT Application No. PCT/EP2021/055271, having a filing date of Mar. 3, 2021, which claims priority to EP Application No. 20163496.1, having a filing date of Mar. 17, 2020, the entire contents both of which are hereby incorporated by reference.

FIELD OF TECHNOLOGY

The following relates to a method and an arrangement of controlling a wind turbine by adjusting a blade pitch angle and at least one blade add-on of at least one wind turbine rotor blade having the blade add-on. Furthermore, the following relates to a wind turbine including the arrangement.

BACKGROUND

Conventionally, rotational speed of a wind turbine has been controlled by adjusting a blade pitch angle of the rotor blade. In particular, above a rated wind speed the pitch angle may have been adjusted to a higher value in order to keep the rotational speed of the rotor at a nominal rotational speed.

However, pitching the blade involves some disadvantages including high load of the blade pitch bearings and load on the hydraulic or electrical pitching system. Loading of these sub-systems or components may be a critical design driver and may add costs to the wind turbine. Thus, it is desired to introduce concepts with less wear of these sub-systems or components.

Thus, there may be a need for a method and a corresponding arrangement for controlling a wind turbine by adjusting a blade pitch angle and at least one blade add-on of at least one wind turbine rotor blade having the blade add-on.

SUMMARY

According to an embodiment of the present invention it is provided a method of controlling a wind turbine by adjusting a blade pitch angle and at least one blade add-on of at least one wind turbine rotor blade having the blade add-on, the method comprising: adjusting a setting of the add-on to meet a control objective while temporarily maintaining a setting of the blade pitch angle.

The method may for example be performed by a wind turbine control or a module of a wind turbine controller. The method may in particular be applied for wind speeds being higher than a nominal wind speed and/or when output power (or torque) reaches or is at a nominal value or setpoint. The method may for example be performed during idling, e.g., when the wind turbine does not supply power to the utility grid and/or when the rotor has very low rotational speed.

The blade add-on may be configured in different manners. The blade add-on may be considered to comprise an active add-on meaning an add-on which may be altered or adjusted regarding its aerodynamically property. The add-on may be installed at a surface or at least exposed at the surface of the rotor blade. The add-on may for example be configured as a spoiler (one-segmented or multi-segmented) or as a flap for example mounted at a rotor blade tip and/or at a trailing edge of the rotor blade (e.g., a trailing edge flap), e.g., covering radial stations, the flap e.g., being present from beyond midspan to close to the blade tip.

According to embodiments of the present invention, adjusting the adjustable or active blade add-on may be employed for controlling the wind turbine in particular for achieving a desired rotational speed even above a rated or nominal wind speed. Furthermore, primarily, according to embodiments of the present invention, the blade add-on may be adjusted without at the same time also adjusting the blade pitch angle. Thereby, a load on blade pitch adjusting components such as gears, pitching actuator and so on may be reduced or even avoided.

Particular actuators, involving hydraulic and/or pneumatic and/or electrical actuators may be employed for adjusting the blade add-on. The add-on may for example comprise plural spoiler segments arranged side by side along a longitudinal direction of the rotor blade at a surface of the rotor blade. Each of the spoiler segments may be actuated independently from the other segments. Each segment may for example be adjusted to be on and/or off corresponding for example to an active surface being flipped-out or flipped-in. A flap may also be turned in or turned out to different degrees.

Adjusting the blade add-on may have an effect on the driving impact of the impacting wind, meaning driving impact on the rotational speed or the torque of the rotor blade exerting on the rotor shaft of the wind turbine. Thus, by adjusting the blade add-on, the rotational speed for example of the wind turbine rotor may be controlled, in particular or at least in a particular range for a given (fixed) blade pitch angle.

Adjusting the setting of the add-on will have an influence on the airflow across the rotor blade surface thereby also influencing the mechanical torque generated due to the rotor blade surface being altered or due to the airflow being altered as flowing across the outer surface of the rotor blade. Thereby, also the torque acting on the wind turbine rotor is altered resulting in an effect on the rotational speed of the rotor.

When the control objective can be met by only adjusting the blade add-on without also adjusting the blade pitch angle, wear and load of components of the blade pitch system may be reduced, therefore prolonging the lifetime of those components.

Temporarily maintaining a setting of the blade pitch angle may include that (primarily) adjustment of the blade add-on is applied to control or achieve the objective. If the objective cannot be met by exclusively adjusting the add-on, then the blade pitch angle may support it with less demands, e.g. only have to adjust the pitch when the blade-add on saturates at limits and/or to more slowly/rarely adjust the blade pitch to get the blade add-on to the right operating point (e.g. ensure that it is not kept in saturation, but moved to a position where it is able to control for both increasing and decreasing speed/wind)

During controlling the blade pitch angle setting may temporarily be maintained but otherwise utilized to ensure excess capacity in the blade-add on setting by adapting to the current operating point as well as assisting the blade-add on setting in achieving the control objective in certain scenarios.

The control objective may for example involve to achieve a particular rotational speed of the rotor, and/or to achieve a particular torque of the rotor blade and/or to achieve a particular power output. In other embodiments, the control objective may involve setting a particular curtailment (i.e., reduction of power below an available power). In these and other embodiments the method may for example be applied for wind speed below (or even above) the nominal wind speed. Whenever it is possible to achieve a control objective by primarily or only adjusting the blade add-on without also adjusting the blade pitch angle, the method may be applied.

Exploiting the controllability of the active blade add-on for different control objectives may result in less pitching and/or better control. This may in particular hold for the case where the control objective is rotational speed of the rotor.

According to an embodiment of the present invention an add-on controller as well as a pitch angle controller is employed for implementing the method. The controllers may for example be implemented using conventionally PI controllers.

Wind turbine blades may have active aerodynamic devices (herein also referred to as add-on) installed which may influence the aerodynamic properties of the rotor blade. Conventionally, however blade add-ons may have not been employed for controlling the wind turbine, and particularly have not been employed for controlling rotational speed.

According to an embodiment of the present invention the control objective includes achieving and/or tracking a reference rotational speed of the rotor at which the blade is mounted, wherein the adjustment of the setting of the add-on is based on a rotational speed error being a difference between the reference rotational speed and the actual rotational speed.

Achieving and/or tracking the reference rotational speed may include to keep the rotational speed (which may fluctuate due to stochastic wind) close to the reference rotational speed.

The reference rotational speed may correspond to a preset quantity which is for example derived from the mechanical/electrical/aerodynamical configuration of the wind turbine. The reference rotational speed may for example correspond to a design rotational speed with which the wind turbine is to be operated during normal production operation. The actual rotational speed may be measured and/or estimated, for example from electrical quantities. Thereby, conventionally available quantities may be utilized for implementing the method.

According to an embodiment of the present invention, the method further comprises adjusting the blade pitch angle based on the rotational speed error and an add-on setting displacement, being a difference between an (reference or actual) add-on setting and a nominal add-on setting, wherein the blade pitch angle is adjusted only if the add-on setting displacement is larger than a displacement threshold and/or if the add-on setting is closer to at least one add-on setting limit than at least one limit threshold. E.g., if the difference (e.g. remaining capacity) between the add-on setting and the add-on setting limit is smaller than the limit threshold (threshold on the remaining capacity), the blade pitch angle may be adjusted, since in this case the add-on may not have sufficient capacity for further regulation as it is close to its end adjustment position.

Adjusting the blade pitch angle may involve turning the rotor blade around a longitudinal axis. The add-on may be associated with a setting at which the add-on under normal conditions should be operated. The nominal add-on setting may for example correspond to a setting where the add-on has an effect of 50% of its total capacity regarding influencing the aerodynamic properties or regarding the airflow around the wind turbine blade. In other embodiments, the nominal add-on setting may for example correspond to a total off-state of the add-on corresponding to a zero or only a very small effect on the airflow compared to the airflow of the rotor blade having no add-on installed. According to other embodiments, the nominal add-on setting may correspond to a desired add-on setting which may be present during normal operation of the wind turbine.

The nominal add-on setting may also be referred to as add-on set point. The add-on set point may be calculated from a requested add-on utilization factor based on the available add-on capacity. Thereby, the utilization factor may be or may comprise:
  a constant,
  a function of turbulence intensity. It could have a conservative (low set point) in high turbulence, leaving higher capacity for the add-ons to deal with wind speed increases which may result in rotational speed increase which may result in over-speed avoidance. In such a case drops in rotational speed may result in possible drops of power being less significant.
  a function of turbine operation values such as power production, idling state, blade load sensor calibration state, rotor balance estimate, or any other turbine state that affects the choice of trade of between over-speed avoidance and power production.

Thus, the nominal add-on setting (also referred to as add-on set point) may depend on the particular operational state of the wind turbine as well on environmental factors, such as wind turbulence and/or wind speed. According to a particular implementation of the method, the nominal add-on setting may be set to be a constant in particular or at least in a predetermined turbulence range and/or in a predetermined range of wind turbine operational parameters.

If the add-on setting displacement is relatively large, the add-on setting is far away from the nominal add-on setting. In this situation, further adjustment of the add-on (at least in a particular direction towards an add-on setting limit) may be not possible anymore or may be possible only in a particular margin. In this situation it is advantageous to also adjust the blade pitch angle in particular in such a manner that the add-on setting may be re-adjusted to more closely approach towards the nominal add-on setting again. Thus, adjusting the blade pitch angle does not exclude that also (later on) the add-on is re-adjusted, in particular towards to the nominal add-on setting. The displacement threshold may be set for example as a constant or may also depend on environmental conditions, such as wind turbulence and/or wind speed and/or wind turbine operational data. The limit threshold may also be set depending on the application.

The add-on setting limit may define a setting of the add-on beyond which the add-on cannot be further moved. So the add-on setting limit may define an adjustment border of the possible adjustment of the add-on, such that it is not possible to adjust the add-on beyond the border. For example, there may be defined a minimum and a maximum add-on setting limit. If the add-on setting is closer to at least one add-on setting limit than at least one limit threshold (i.e., the difference between the add-on setting and the add-on setting limit is smaller than the limit threshold), it may indicate that the add-on cannot be adjusted anymore sufficiently to achieve the control objective. In this case, it is advantageous to control instead or additionally the blade pitch angle. In general, adjusting the blade pitch angle may have a larger effect on the torque or the rotational speed than adjusting the add-on.

According to an embodiment of the present invention the nominal add-on setting corresponds to a setting from which the add-on can be adjusted in two different/opposing directions (e.g., across similar setting ranges) having different/ opposing aerodynamic effect on a blade wind interaction and/or wind driving force and/or airflow around the blade.

When the add-on is at its nominal add-on setting, the add-on may be adjusted to either increase the torque or decrease the torque generated by the air flowing around the rotor blade surfaces and the add-on for effectively controlling the rotational speed. Thus, trying to keep the add-on at its nominal add-on setting, advantageously may ensure the possibility to control the rotational speed upwards as well as downwards, as needed. Thereby the control of the rotational speed may be improved.

According to an embodiment of the present invention, the method further comprises calculating an add-on setting displacement related control quantity based on the add-on setting displacement using a first function, wherein adjusting the blade pitch angle based on the add-on setting displacement comprises adjusting the blade pitch angle based on the add-on setting displacement related control quantity.

The 'add-on setting displacement related control quantity' may be considered as a quantity which depends on or is a function of the add-on setting displacement. Thereby, the first function is utilized. The first function may be implemented in different manners. In the first function it may be implemented to avoid adjusting the blade pitch angle unless the add-on setting displacement is relatively large, in order to reduce load of blade pitch angle adjustment equipment. By defining the first function high flexibility is provided for implementing the method for meeting particular application needs.

According to an embodiment of the present invention, the method further comprises calculating a 'rotational speed error related control quantity' based on the rotational speed error using a second function, wherein adjusting the blade pitch angle based on the rotational speed error comprises adjusting the blade pitch angle based on the 'rotational speed error related control quantity'.

The 'rotational speed error related control quantity' may be considered as a quantity which is dependent on or a function of the rotational speed error. The second function may allow a flexible implementation and may in particular allow to adjust the blade pitch angle only in cases wherein the rotational speed error is relatively large or at least has such a value which cannot be decreased by adjusting the blade add-on (only). For example, for a relatively small rotational speed error the rotational speed error related control quantity may for example be zero. Only for a rotational speed error larger than for example a rotational speed error threshold, the rotational speed error related control quantity may be different from zero. Only in those cases the blade pitch angle may be adjusted, while for the rotational speed error being smaller than a speed error threshold there may be no blade pitch angle adjustment being performed. Herein rotational speed error may mean an absolute value (i.e., always positive or zero) of a difference (which may be positive or negative) between a reference rotational speed and the actual rotational speed. Thereby, load and wear of blade pitch angle adjustment equipment may be reduced.

According to an embodiment of the present invention, the method further comprises calculating at least 'one add-on setting related control quantity' based on the add-on setting using a third function including at least one add-on setting limit, calculating a 'rotational speed error and add-on related control quantity' based on the rotational speed error and the add-on setting related control quantity using the second function, wherein adjusting the blade pitch angle based on the rotational speed error comprises adjusting the blade pitch angle based on the 'rotational speed error and add-on related control quantity', wherein the add-on setting limit defines in particular a border setting beyond which the setting cannot be decreased or increased.

When the add-on setting related control quantity is calculated based on the add-on setting, also the capacity of the add-on is considered, i.e., it is considered whether the add-on at all is capable of further adjustments for meeting the control objective. Thereby, the third function including at least one add-on setting limit, in particular a maximum add-on setting limit and a minimum add-on setting limit, is utilized. This capacity information can then be advantageously utilized for calculating the rotational speed error related control quantity. Thus, it can be implemented to avoid adjusting the rotor blade pitch angle not only when the rotational speed error is relatively small but also in the case when for example it turns out that the add-on has still sufficient capacity to perform the rotational speed control by its own. Furthermore, thereby it may be implemented to in fact adjust the rotor blade pitch angle if the speed error is relatively large and further if the capacity of the blade add-on is not sufficient to achieve the control objective.

According to an embodiment of the present invention, the method includes supplying the rotational speed error to a speed-add-on controller which outputs a reference add-on setting; supplying the reference add-on setting and a nominal add-on setting to a difference element to calculate the add-on setting displacement; applying the first function to the add-on setting displacement to obtain the add-on setting displacement related control quantity; applying the second function at least to the rotational speed error to obtain a rotational speed error related control quantity; supplying the add-on setting displacement related control quantity and the rotational speed error related control quantity to a speed-pitch controller which outputs a reference blade pitch angle.

Thereby, a particular control scheme is provided for implementing the method. Other control schemes may be derived and also being within the scope of embodiments of the present invention which implement the functionality as described above in different embodiments. The add-on controller as well as the pitch controller may be implemented for example as PI controller. All quantities may be physically realized as optical and/or electrical and/or electronical and/or wireless signal and may be supplied using conductive wires, optical wires, as appropriate. The method may in general be implemented in software and/or hardware. The first function and/or second function and/or third function may be implemented as software modules, for example. A blade pitch actuator may be supplied with the reference blade pitch angle causing the actuator to adjust the blade pitch angle of the rotor blade accordingly. An add-on actuator may be supplied with the reference add-on setting which may result in the actuator adjusting or moving the add-on (or at least an active surface thereof) in order to apply or adjust the add-on setting.

According to an embodiment of the present invention, the method further comprises applying the third function to the reference add-on setting to obtain the add-on setting related control quantity; applying the second function further to the add-on setting related control quantity and the rotational speed error to obtain a 'rotational speed error and add-on setting related control quantity'; applying the 'add-on setting displacement related control quantity' and the 'rotational speed error and add-on setting related control quantity' to a speed-pitch controller which outputs a reference blade pitch angle.

The first function acts on the add-on setting displacement, i.e., on the difference between a reference (or actual) add-on setting and the nominal add-on setting. The second function acts at least on the rotational speed error but may additionally also act on the add-on setting related control quantity. This add-on setting related control quantity may capture whether the add-on still has adjustment capacity in order to fulfil control functions. The 'rotational speed error and add-on setting related control quantity' may capture the rotational speed error as well as the add-on setting related control quantity. Therefore, this quantity is suitable to implement a consideration of the rotational speed error as well as the add-on setting capacity. In this case, the pitch controller may obtain or being supplied with as input two error values as input signal. The pitch controller (e.g., PI controller) may be implemented as for example to operate on the sum (or weighted sum) of the error input. In other embodiments, the two error inputs may be processed in parallel and the result of the two parallel branches may be added at the end.

According to an embodiment of the present invention, the first and/or the second function comprises at least one of a 1D or 2D gain schedule function; a dead band function.

The gain schedule function and dead band function may provide different implementations of the different functions. Thereby, high flexibility is achieved. For a relatively simple implementation a dead band function may be utilized for the first and also the second function.

According to an embodiment of the present invention, the dead band function comprises a first linear section with positive slope up to a first error value, beyond the first error value a horizontal section up to a second error value, and beyond the second error value a second linear section with positive slope. The first error value as well as the second error value as well as the slope value may be defined or set depending on the particular application. More complex functions can be achieved using the 2D gain scheduling.

According to an embodiment of the present invention, the gain schedule function comprises a first non-linear section with positive slope (and/or being monotonically increasing, including e.g. to be horizontal in the beginning for large errors) up to a first error value, beyond the first error value a horizontal section up to a second error value, and beyond the second error value a second non-linear section with positive slope. Thereby, embodiments of the present invention are not restricted to linear responses to the different errors. Thereby, higher flexibility and better control performance may be achieved.

According to an embodiment of the present invention, the add-on includes at least one of a one segment or multi-segment spoiler, in particular mounted along a longitudinal direction of the blade; a flap, in particular mounted at a tip end of the blade.

Possible add-ons may include:
15) Spoiler, e.g., having discrete setting, i.e. open or close, one- or multi-segmented.
  2) Trailing edge flaps, continuous in operation (adjustable angle), e.g. one or more segments.

Other types of add-ons are possible. It should also be understood that different kinds or manners of add-ons may simultaneously be present at the rotor blade and all or each of these add-ons may be controlled in combination with the control of all other add-ons also in combination with or in dependence of the rotor blade pitch control. In particular, embodiments of the present invention may also envisage a staggered control starting from add-ons which have the smallest impact on the aerodynamic property, followed by the control of add-ons having intermediate effect on the aerodynamic control or aerodynamic influence.

It should be understood that features, individually or in any combination, disclosed, described, explained or provided for a method of controlling a wind turbine by adjusting a blade pitch angle and at least one blade add-on of at least one wind turbine rotor blade are, individually or in any combination, also applicable to an arrangement for controlling a wind turbine by adjusting a blade pitch angle and at least one blade add-on of at least one wind turbine rotor blade according to embodiments of the present invention and vice versa.

According to an embodiment of the present invention, it is provided an aarrangement for controlling a wind turbine by adjusting a blade pitch angle and at least one blade add-on of at least one wind turbine rotor blade having the blade add-on, the arrangement comprising a control module adapted to adjust a setting of the add-on to meet a control objective while temporarily maintaining a setting of the blade pitch angle.

Furthermore, it is provided a wind turbine, comprising at least one rotor blade having an add-on installed; and an arrangement according to the preceding embodiment coupled to a blade pitch adjustment system and an add-on adjustment system.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 11 schematically illustrates a wind turbine comprising a rotor having mounted thereon plural rotor blades wherein at least one has an adjustable add-on.

DETAILED DESCRIPTION

Figure 1:
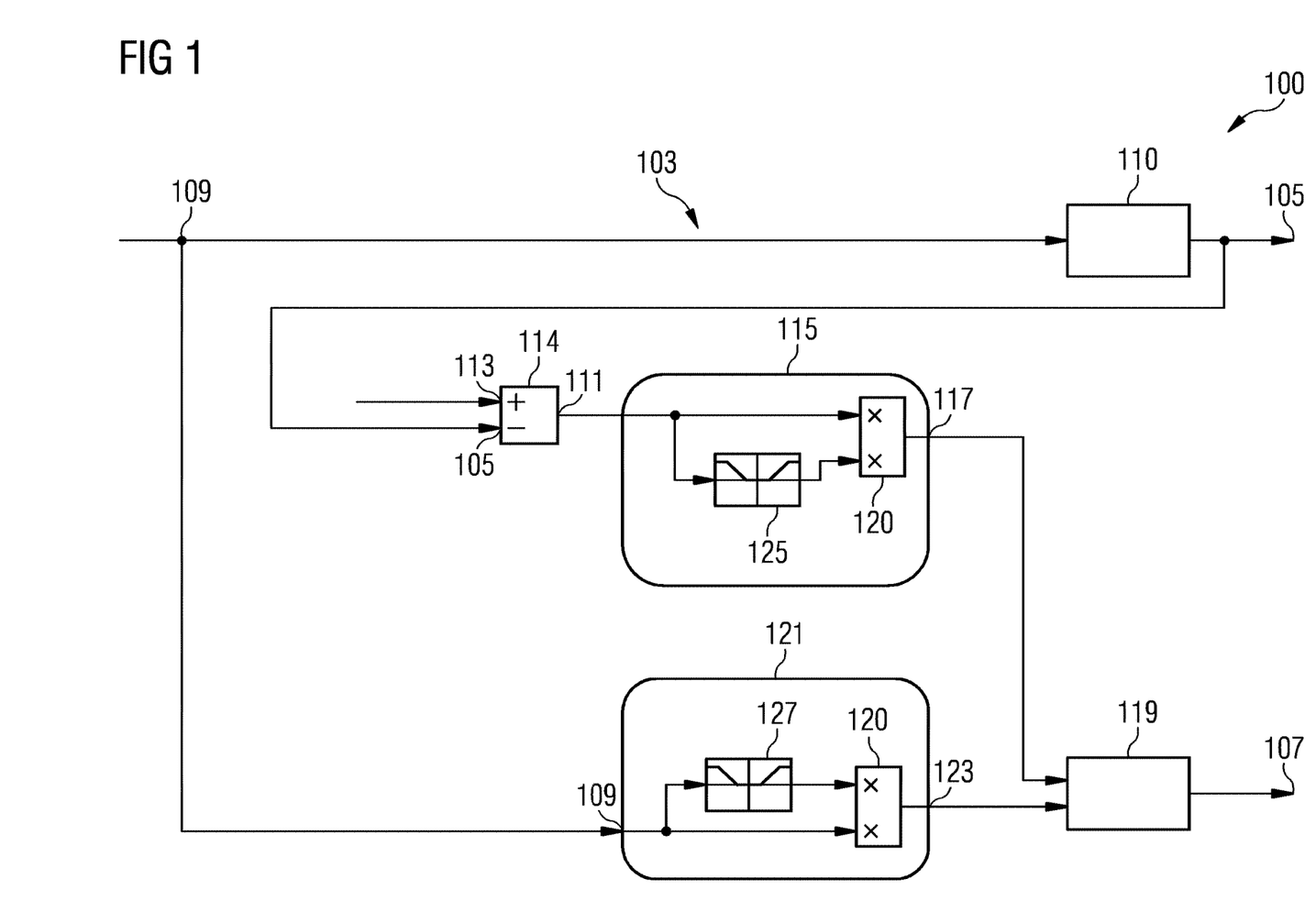
FIG. 1 schematically illustrates an arrangement for controlling a wind turbine by adjusting a blade pitch angle and at least one blade add-on of at least one wind turbine rotor blade having the blade add-on according to an embodiment of the present invention implementing a method of controlling a wind turbine according to an embodiment of the present invention.

The arrangement 100 schematically illustrated in FIG. 1 for controlling a wind turbine by adjusting a blade pitch angle and at least one blade add-on according to an embodiment of the present invention includes a control module 103 which is adapted to adjust a setting of the add-on to meet a control objective while maintaining a setting of the blade pitch angle, thus being adapted to carry out a method according to an embodiment of the present invention.

Figure 11:
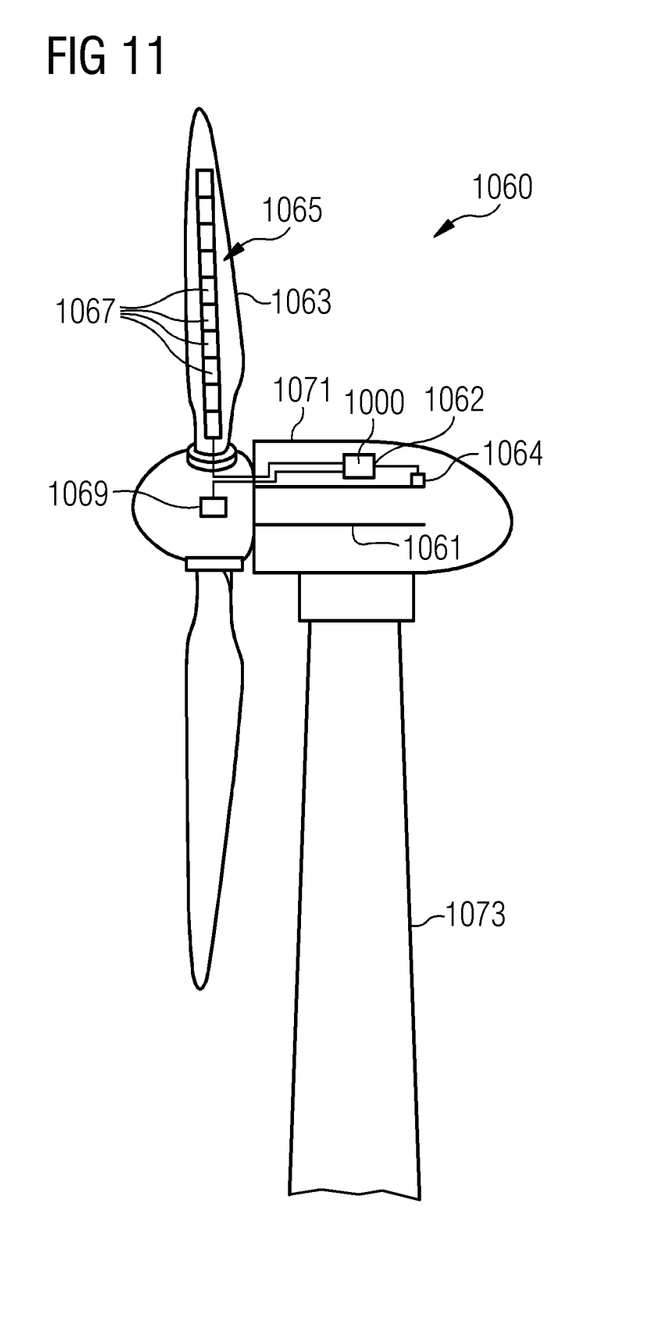

Thereby, the setting of the add-on is adjusted by providing a reference add-on setting 105 to a not illustrated actuator which is configured to move the add-on (see e.g. FIG. 11 showing add-on 1065) for adjusting the setting. Furthermore, the arrangement 100 outputs a reference blade pitch angle 107. However, this reference rotor blade pitch angle 107 is maintained at least in a particular range of the speed error 109, as will be explained in detail below.

In the schemes illustrated in the figures, the control objective is to achieve and/or to track a reference rotational speed of the rotor at which the blade is mounted. The rotational speed error 109 is thereby calculated and input to the arrangement 100 as being a difference between the reference rotational speed (for example the design speed of the wind turbine) and an actual rotational speed, for example measured or estimated and possibly filtered. Primarily, the blade add-on may be adjusted by using the reference add-on setting 105, while the rotor blade pitch angle is maintained constant for relatively small rotational speed errors 109. The speed-add-on controller 110 determines the add-on setting 105 based on the rotational speed error 109.

However, the blade pitch angle may be adjusted based on the rotational speed error 109 and an add-on setting displacement 111, being a difference of the reference add-on setting 105 and a nominal add-on setting 113. The blade pitch angle may be adjusted only, if the rotational speed error is larger than a threshold and/or if the add-on setting displacement 111 is larger than a displacement threshold and/or if the add-on setting or the reference add-on setting 105 is closer to at least one add-on setting limit than at least one limit threshold (e.g. if the add-on setting is too close to the add-on setting limit, so that there is not enough adjustment capacity left). Thereby, unnecessarily adjusting the blade pitch angle may be avoided.

In FIG. 1 a first function block 115 is indicated which calculates an add-on setting displacement related control quantity 117 based on the add-on setting displacement 111.

The add-on setting displacement related control quantity 117 is input to a speed-pitch controller 119 and the reference blade pitch angle 107 is adjusted or calculated based on the add-on setting displacement related control quantity 117.

In FIG. 1 a second function module 121 is indicated which calculates based on the rotational speed error 109 a rotational speed error related control quantity 123. The reference rotor blade pitch angle 107 is calculated based on the rotational speed error related control quantity 123. In particular, both, the add-on setting displacement related control quantity 117 as well as the rotational speed error related quantity 123 are input to the speed-pitch controller 119 based on which the reference pitch angle 107 is derived.

The first function module 115 is implemented by a first gain schedule 125 which acts on the add-on setting displacement 111. The output of the gain schedule 125 is multiplied with the add-on setting displacement 111 using multiplication element 120 to result in the add-on displacement related control quantity 117.

Furthermore, the second control module 121 is implemented using a second gain schedule 127 which acts on the rotational speed error 109. The output of the gain schedule 127 is multiplied with the rotational speed error 109 to result in the 'rotational speed error related control quantity' 123.

It should be understood that features or elements similar in structure and/or function in different embodiments are illustrated in the different figures with reference signs differing only in the first digit. A description of a particular element not in detail described with reference to a particular embodiment may be taken from the description of this corresponding element in another figure or embodiment.

According to an embodiment of the present invention, a speed control scheme is proposed utilizing both, active blade add-ons and pitch actuators. Thus, at least two blade actuation systems are used working together to control the rotational speed of the rotor. Thereby, at least two controllers are utilized:

A speed-add-on controller (for example a PID controller) that adjust a blade add-on reference to control rotational speed, and a speed-pitch controller (for example a PID controller) that adjusts a pitch reference to control a combination of rotational speed and blade add-on position which gains schedules based on both quantities.

The control schemes illustrated in the figures may allow that blade add-ons have the highest priority for controlling the rotational speed whereas the pitch activity may be reduced and work primarily to get the operating point at a desired region. Pitch actuation is primarily used for handling large rotational speed fluctuations and for changing operating point.

Figure 2:
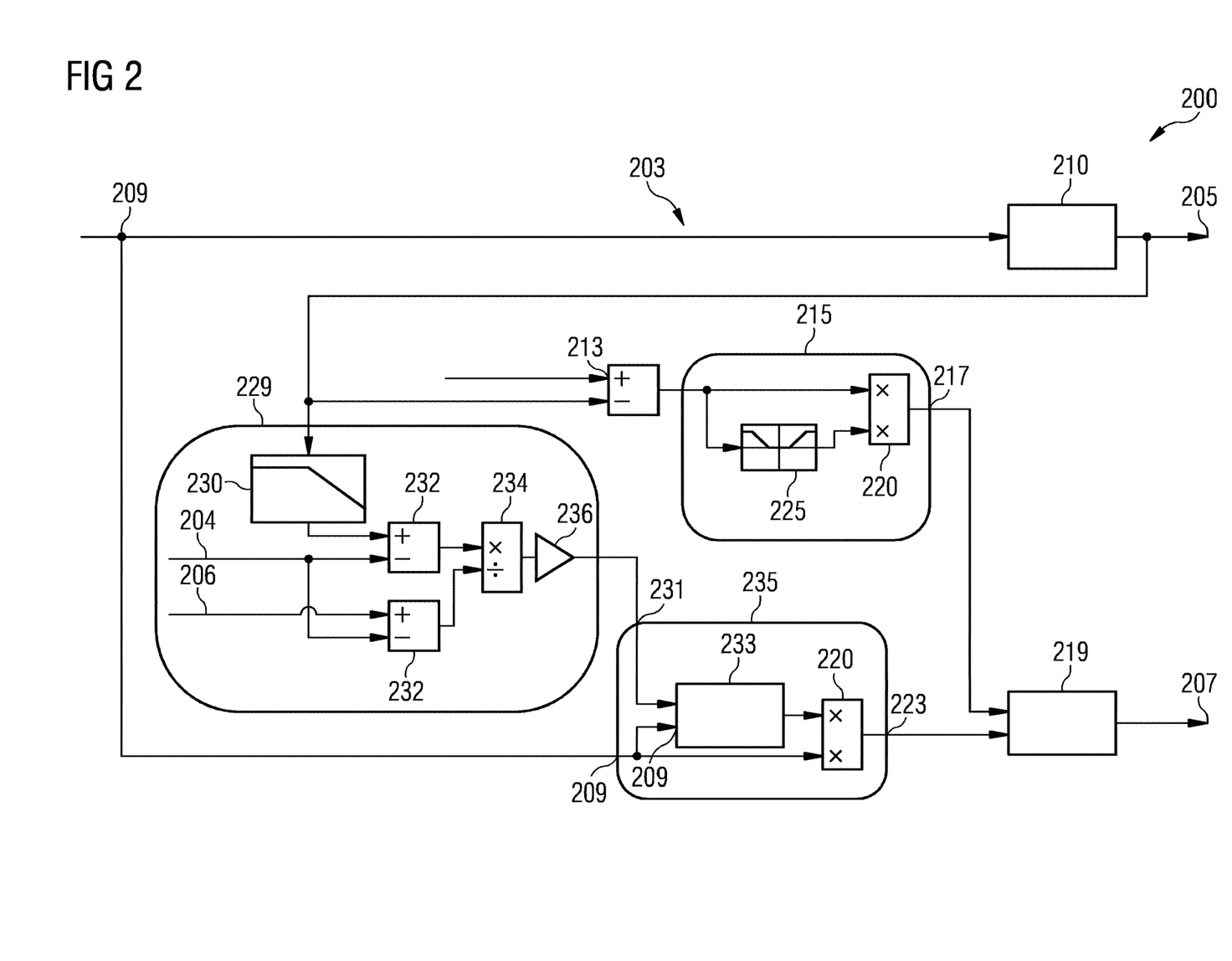
FIG. 2 schematically illustrates an arrangement for controlling a wind turbine by adjusting a blade pitch angle and at least one blade add-on of at least one wind turbine rotor blade having the blade add-on according to an embodiment of the present invention implementing a method of controlling a wind turbine according to an embodiment of the present invention.

In FIGS. 1 and 2 gain scheduling is used to prioritize which actuator has priority for controlling rotational speed. The gain schedules (for example 125, 127) may have values between 0 and 1 and may be used to reduce pitch actuation while rotational speed is maintained at its set point utilizing the blade add-ons.

The gain schedule 127 may ensure that the speed-pitch controller 119 will not act on smaller speed errors that can be managed by the speed-add-on controller 110.

In FIG. 1 the rotational speed error 109 is provided as an input to a speed-add-on controller 110 which derives there from the reference add-on setting 105.

The add-on setting displacement 111 is applied to the first function 125. This first gain scheduling function 125 may ensure that the speed-pitch controller 119 only acts on an add-on displacement 111 whenever the speed-add-on controller is a given distance from its nominal add-on setting 113. This feature may ensure that the pitch angle will on average keep the add-on at its nominal (desired) condition by (slowly) adapting to the new operating point.

The arrangement 200 illustrated in FIG. 2 has similarities to the arrangement 100 illustrated in FIG. 1. However, the arrangement 200 additionally comprises a third function module 229. Therein, a add-on setting related control quantity 231 is calculated by the third function module 229 and is provided as an input to a 2-D gain schedule 233 together with the rotational speed error 209. As can be taken from FIG. 2, the reference blade pitch angle 207 is based on the rotational speed error 209 as well as on the add-on setting related control quantity 231.

As can be seen, the second control module 235 in FIG. 2 is similar to the second function module 121 illustrated in FIG. 1 and outputs the rotational speed error related control quantity 223 which is input to the speed-pitch controller 219 to derive the reference blade pitch angle 207 also based on the add-on setting displacement related control quantity 217 as output by the first control module 215 being similar to the first control module 115 illustrated in FIG. 1. Thus, in FIG. 2, the rotational speed error related quantity 223 is also derived based on the remaining capabilities of the add-on from its limits.

In FIG. 2 the gain schedules 225, 233 may vary between 0 and 1 and are used to reduce pitch actuation while rotational speed is maintained at its set point utilizing the blade add-on. In FIG. 2, the rotational speed error related control quantity 223 is obtained using a 2D lookup table or 2D gain schedule 233. The scheduling variables may be the speed error and some function of the add-on reference. This function can present the add-on reference as a percentage of the availability of add-on capacity. The add-on capacity is set by the minimum and maximum reference values.

In FIG. 2, the third function 229 is implemented by using a low pass filter 230, difference elements 232 and one division element 234. A minimum add-on reference 204 and a maximum add-on reference 206 are input to the difference elements 232 and to one of the difference elements 232 the output of the low pass filter 230 is provided. The output of the difference elements 232 is supplied to the division element 234. Using a gain element 236 an amplification of the output of the division element 234 is performed. The resulting add-on setting related control quantity 231 is thus a function of the reference add-on setting 205, as well as the minimum and the maximum add-on setting 204, 206.

Figure 3:
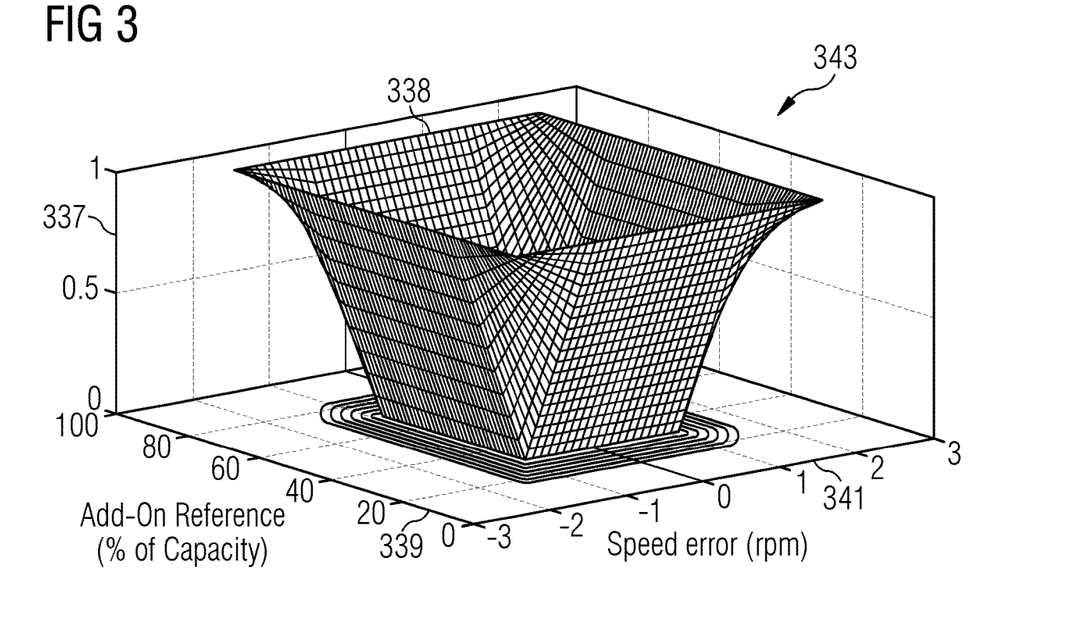
FIG. 3 illustrates an example of a 2D gain schedule as employed according to embodiments of the present invention.
Figure 4:
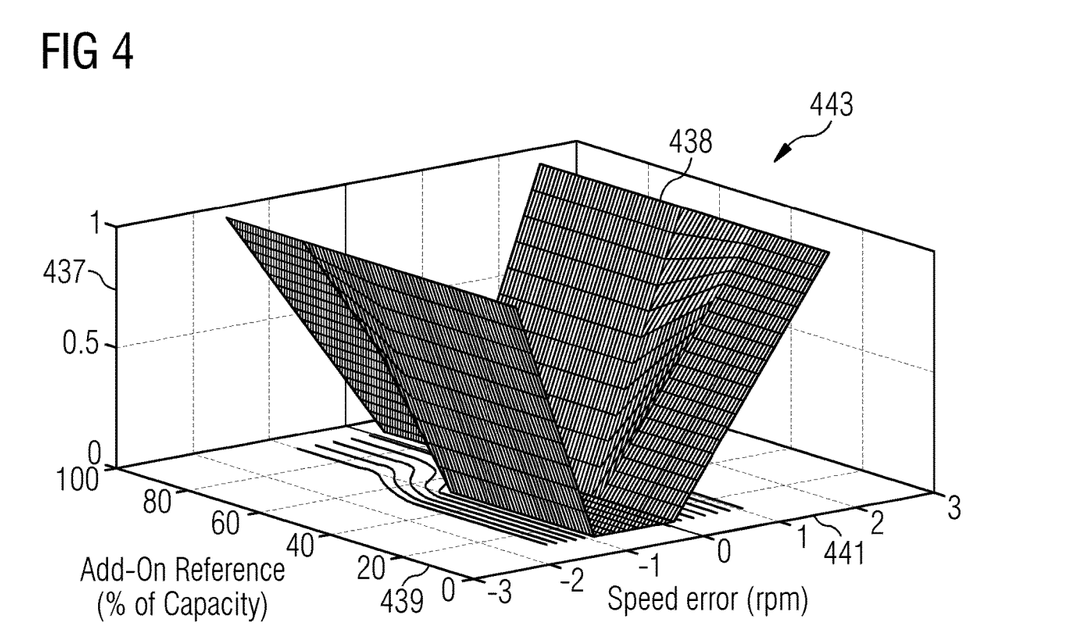
FIG. 4. Illustrates an example of a 2D gain schedule as employed according to embodiments of the present invention.

Two examples of the 2D gain schedules 338, 438 (graphs 343, 443) are presented in FIGS. 3 and 4. Therein, the gain is indicated on the ordinates 337, 437 which is plotted over the add-on reference capacity 339, 439 as well as the speed error 341, 441. FIG. 3 illustrates an example where for small speed errors and an add-on reference far away from its limits the gain is 0. By either a large speed error or an add-on reference close to its limits can make the gain scheduling increase and become unity.

FIG. 4 illustrates an example, where the gain scheduling depends on the sign of the speed error and on whether the add-on is closer to its minimum or to its maximum limit. The 2D gain schedule lookup can also be set to vary across only one of its two dimensions: either speed error or a function of the add-on reference, making it effectively a 1D gain schedule.

According to an embodiment, the arrangements illustrated in FIGS. 1 and 2 may be utilized to provide an example where the gain scheduling is used to prioritize which actuator has priority for control the rotational speed, giving that the add-ons are operated in an on/off manner. This may for example be applied when the add-on is formed by several segments (for example 4 to 10 or 12) which may be open or closed or on and off (not to be controlled continuously).

Given the number of blade add-on segments N, the maximum limit for the blade add-on reference may be defined in percentage of the available segments as (in %)

$$R\max=(N-N\_\text{failed})/N*100,$$

where N_failed is the number of failed segments. In this example, the lower reference limit is left unchanged at Rmin=0%. Rmin may relate to 204 and Rmax may relate to 206 in FIG. 2.

One or more active add-on devices and concepts can be used. One example is the use of segmented add-ons where a set of elements can independently cause an aerodynamic stall at localized sections of the rotor blade. Active flaps may be another add-on device.

The speed control concept explained herein, may have multiple applications, since the speed control is a discipline in multiple applications of wind turbine control. This may include, but not be restricted to:

Use of active blade add-ons for speed control during curtailed operation. This may reduce pitch activity. Thereby, it may be that requirements to speed tracking are relaxed for such operation.

Use active blade add-ons for speed control during active idling. During active idling, it may be sufficient to control the speed inside a rotational speed range (as opposed to a single set point value) and control may happen via active blade add-ons alone, saving wear and energy consumption for the pitch system, or use the pitch system only rarely to have partial savings/reductions.

Use active blade add-ons for speed control during resonance avoidance. There are several speed regions where operation is unintended, for example if the tower frequency and the 1P or 3P rotation frequency collide. Here, active blade add-ons can be applied to force operation out of the speed regions.

Use active blade add-ons for speed control during high wind speed operation. This may reduce pitch activity. It may be that requirements for speed tracking is relaxed for such operation, at least if speed support is reduced for high winds.

Use active blade add-ons for speed control during self-sustained operation. It may be desired to control speed by active blade add-ons to save wear and power consumption of a pitch system.

Several of the following advantages or technical features may be achieved: Costs may be reduced because blade pitch bearing and (hydraulic or electrical) pitch system loading may be reduced due to reduced pitched reference excitation via gain scheduling that excludes control errors that can be handled by add-ons. Alternatively, this may enable larger turbines with similar hardware for pitch bearings and pitch system.

Performance in power production may be maintained or improved because add-ons acting on speed error may be used for maintaining or improving speed regulation performance resulting in fewer drops below nominal speed and/or leading to fewer drops below nominal power. Control of the add-on according to embodiments of the present invention may also be performed during startup dependent on wind speed and power reference.

Figure 5:
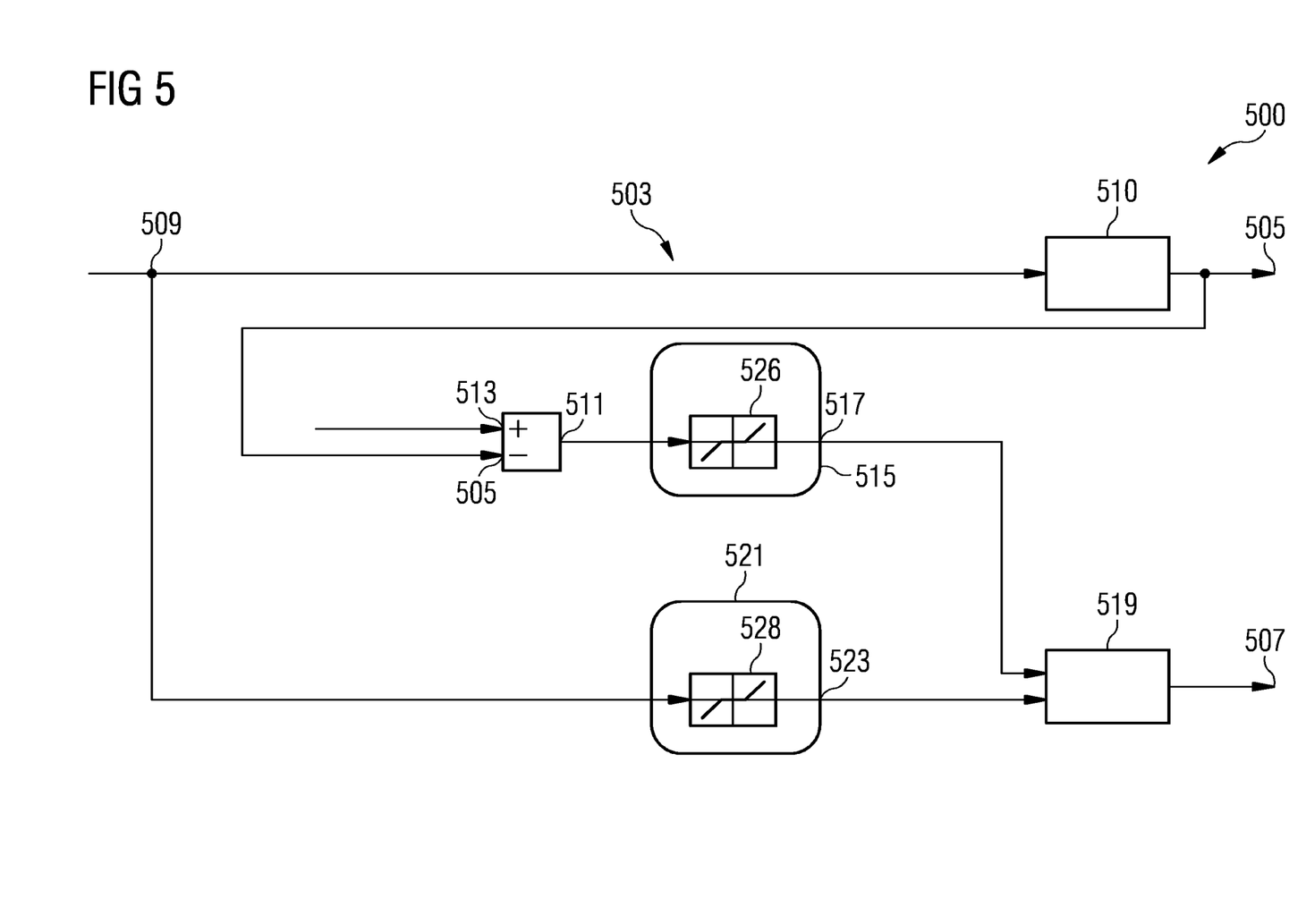
FIG. 5 schematically illustrates an arrangement for controlling a wind turbine by adjusting a blade pitch angle and at least one blade add-on of at least one wind turbine rotor blade having the blade add-on according to an embodiment of the present invention implementing a method of controlling a wind turbine according to an embodiment of the present invention.
Figure 6:
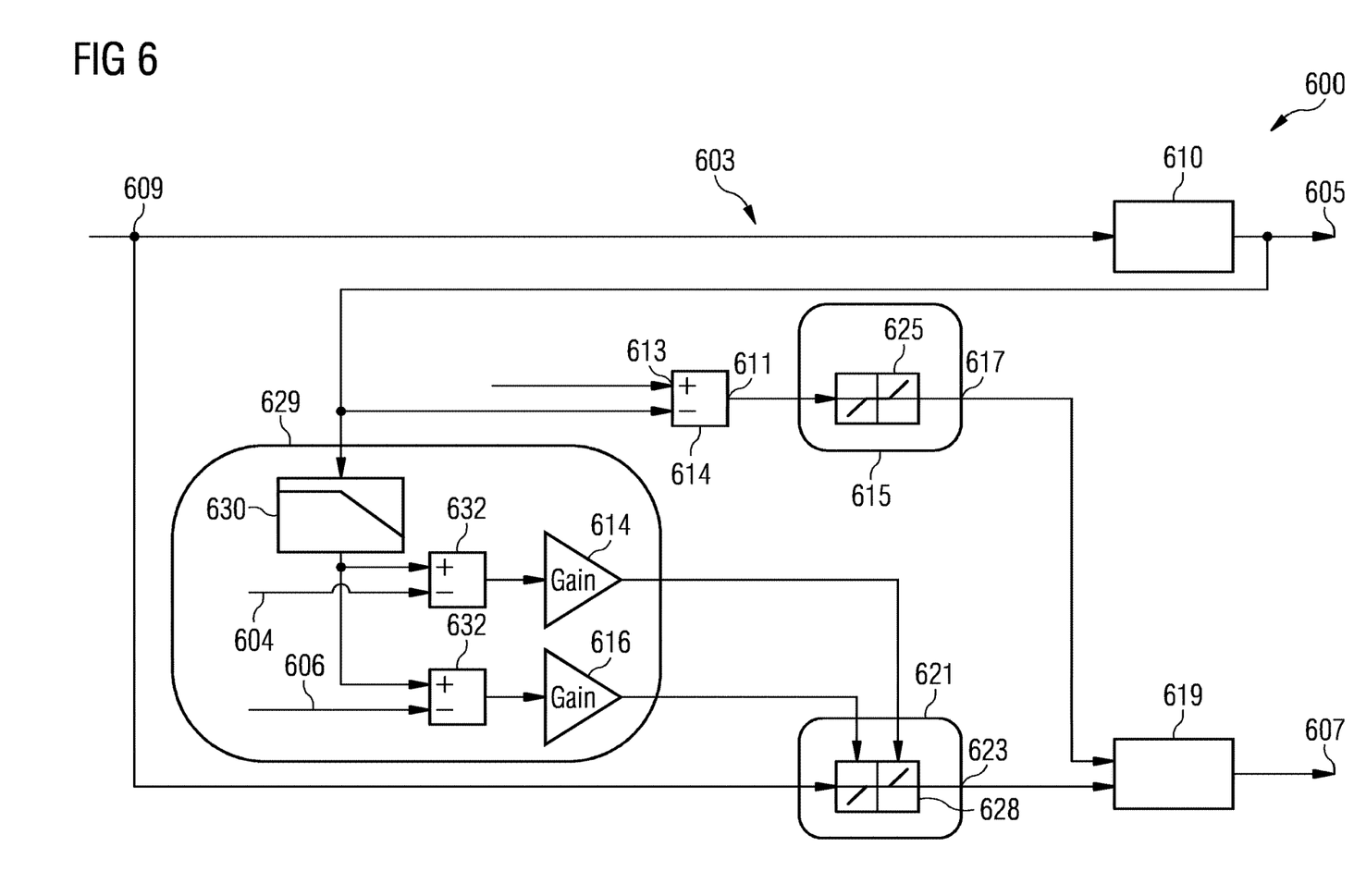
FIG. 6 schematically illustrates an arrangement for controlling a wind turbine by adjusting a blade pitch angle and at least one blade add-on of at least one wind turbine rotor blade having the blade add-on according to an embodiment of the present invention implementing a method of controlling a wind turbine according to an embodiment of the present invention.

FIGS. 5 and 6 illustrate further embodiments of arrangements 500 and 600 for controlling according to embodiments of the present invention, wherein the control modules 515, 521 do not use gain schedules but use a dead zone function, in particular a first dead zone function 526 and a second dead zone function 528. However, these first function 515 and second function 521 have similar effects as the functions 115 and 121 illustrated in FIG. 1.

In FIG. 6, the third function 629 also comprises a low pass filter 630 and difference elements 632. However, the outputs of the difference elements are provided to gain elements 614, 616 which provide a definition in the positive range of the dead zone function 628 and a definition in the negative range of the dead zone function, respectively. Thereby, the width of this dead zone element 628 may be set by the difference between the add-on reference and add-on minimum and maximum limits, which represents the remaining ability of the add-ons to act to regulate speed in each direction. Thus, the outputs of the third function module 629 may define from which error value on at the positive error range the output of the dead zone 628 is different from 0 and from which error value on the output in the negative error range is different from 0.

Alternatively or additionally for example the slope for positive rotational speed error may be differently adjusted as the slope of the dead zone module 628 in the negative rotational speed error range. Thereby, more flexibility is achieved.

Figure 7:
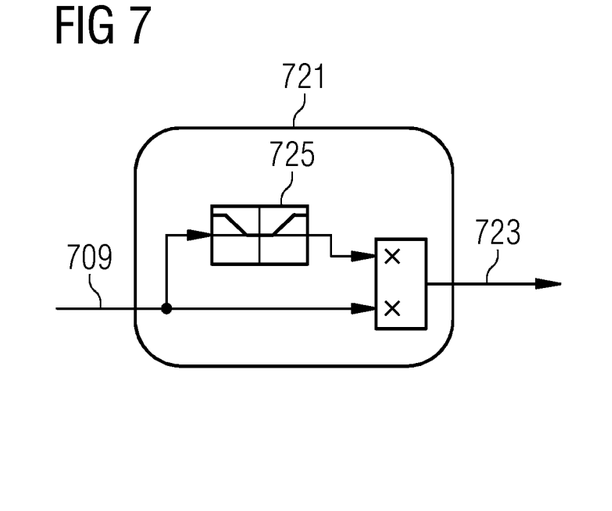
FIG. 7 illustrates an implementation of first or second function modules.
Figure 8:
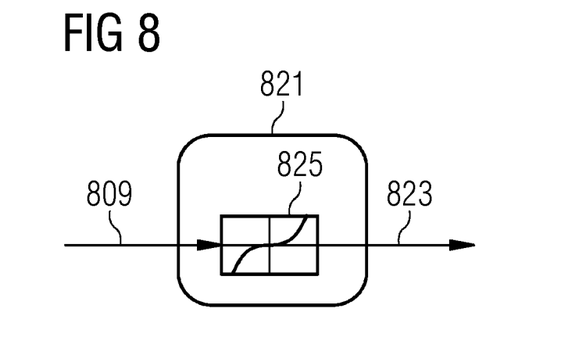
FIG. 8 illustrates another implementation of first or second function modules.
Figure 9:
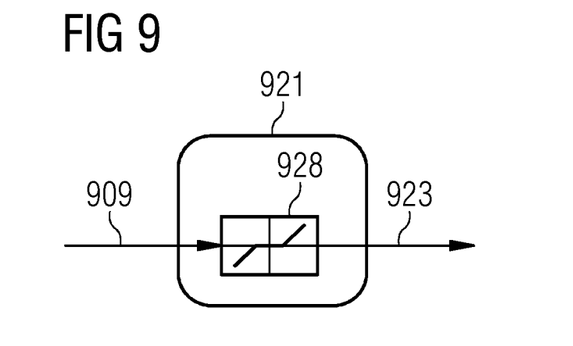
FIG. 9 illustrates possible implementations for deriving an error related quantity based on an error as utilized for example in embodiments of the present invention, in particular in a first function, a second function and/or a third function.

FIGS. 7, 8 and 9 illustrate different implementations of first or second function modules 721, 821, 921, which can for example be utilized in any of the afore-described embodiments as first function module and/or second function module. The schedule or gain schedule 725 of the first function module 721 illustrated in FIG. 7 is applied to the rotational speed error 709 and the result is multiplied with the rotational speed error 709 to result in the speed error related control signal 723.

In FIG. 8 the rotational speed error 809 is applied to the gain schedule 825 to result in the rotational speed related control signal 823.

In FIG. 9 the rotational speed error 909 is applied to the dead zone element or function 928 to result in the rotational speed related control quantity 923.

Figure 10:
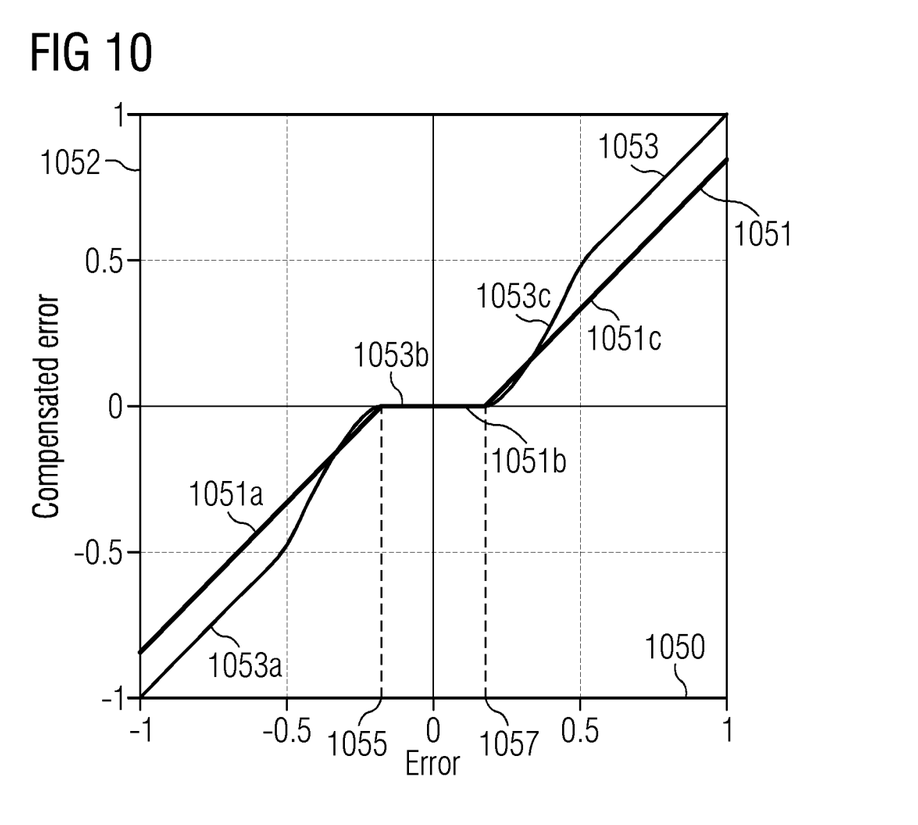
FIG. 10 illustrates a coordinate system having an abscissa indicating an error and an ordinate indicating an output of a gain schedule module or a dead zone module.

FIG. 10 illustrates a coordinate system having an abscissa 1050 indicating an error and an ordinate 1052 indicating an output of a gain schedule module or a dead zone module such as those used and illustrated in the afore-mentioned figures. The curve 1051 illustrates an example of a dead zone and the curve 1053 illustrates an example gain scheduling.

The dead zone curve 1051 comprises a first linear section 1051*a* with a positive slope up to a first error value 1055, comprises a horizontal section 1051*b* beyond the first error value and up to a second error value 1057 and further comprises beyond the second error value 1057 a second linear section 1051*c*.

The gain scheduling curve 1053 comprises a first non-linear section 1053*a* up to the first error value 1055, comprising a horizontal section 1053*b* beyond the first error value 1055 and up to a second error value 1057 and comprises a second non-linear section 1053*c* beyond the second error value 1057. Outside the first error value and the second error value the gain scheduling function 1053 may comprise linear sections.

FIG. 11 schematically illustrates a wind turbine 1060 comprising a rotor 1061 having mounted thereon plural rotor blades 1063 wherein at least one has an adjustable add-on 1065, for example comprising plural segments 1067 of a spoiler. The wind turbine 1060 comprises further an arrangement 1000 which may be configured as the arrangements 100, 200 or 500 or 600 illustrated in FIG. 1, 2, 5 or 6. The arrangement 1000 controls the setting of the add-on 1065 as well as the rotor blade pitch angle by using a pitching system 1069, wherein the rotational speed 1062 as measured by a sensor 1064 (and e.g. other input values) is received. The rotor 1061 is harbored inside a nacelle 1071 which is mounted on top of a wind turbine tower 1073.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a wind turbine comprising:
providing a blade having an add on,
adjusting an add-on setting of the add-on to meet a control objective while temporarily maintaining a setting of a blade pitch angle, and
adjusting the blade pitch angle of the blade based on a rotational speed error and an add-on setting displacement, being a difference between a reference add-on setting and/or an actual add-on setting, on the one hand, and a nominal add-on setting, on the other hand, wherein the nominal add-on setting corresponds to a setting wherein the add-on has an effect of 50% of a total capacity regarding influencing aerodynamic properties of the blade or regarding airflow around the blade and/or a desired setting for normal operation of the wind turbine, a total off-state of the add-on, and/or an add-on set point calculated from an add-on utilization factor;
wherein the blade pitch angle of the blade is adjusted only:
when the rotational speed error is larger than a rotational speed error threshold, and/or
when the add-on setting displacement is larger than a displacement threshold, and/or
when the reference add-on setting and/or the actual add-on setting is closer to at least one add-on setting limit than at least one limit threshold.

2. The method according to claim 1,
wherein the control objective includes achieving and/or tracking a reference rotational speed of a rotor at which the blade is mounted,
wherein the adjusting the setting of the add-on is based on the rotational speed error, wherein the rotational speed error is a difference between the reference rotational speed and an actual rotational speed.

3. The method according to claim 1, wherein the nominal add-on setting corresponds to a setting from which the add-on is adjusted in two different and/or opposing directions having different and/or opposing aerodynamic effect on a blade wind interaction and/or wind driving force and/or airflow around the blade.

4. The method according to claim 3, further comprising:
calculating an add-on setting displacement related control quantity based on the add-on setting displacement using a first function, wherein adjusting the blade pitch angle based on the add-on setting displacement comprises adjusting the blade pitch angle based on the add-on setting displacement related control quantity.

5. The method according to claim 1, further comprising:
calculating a rotational speed error related control quantity based on the rotational speed error using a second function,
wherein adjusting the blade pitch angle based on the rotational speed error comprises adjusting the blade pitch angle based on the rotational speed error related control quantity.

6. The method according to claim 1, further comprising:
calculating at least one add-on setting related control quantity based on the add-on setting using a third function including at least one add-on setting limit,
calculating a rotational speed error and add-on related control quantity based on the rotational speed error and the add-on setting related control quantity using a second function, wherein adjusting the blade pitch angle based on the rotational speed error comprises adjusting the blade pitch angle based on the rotational speed error and add-on related control quantity, wherein the at least one add-on setting limit defines a border setting beyond which the setting cannot be decreased or increased.

7. The method according to claim 1, including:
supplying the rotational speed error to a speed-add-on controller which outputs a reference add-on setting;
supplying the reference add-on setting and a nominal add-on setting to a difference element to calculate an add-on setting displacement;
applying a first function to the add-on setting displacement to obtain an add-on setting displacement related control quantity;
applying a second function at least to the rotational speed error to obtain a rotational speed error related control quantity;
supplying the add-on setting displacement related control quantity and the rotational speed error related control quantity to a speed-pitch controller which outputs a reference blade pitch angle.

8. The method according to claim 1, further comprising:
applying a third function to the reference add-on setting to obtain an add-on setting related control quantity;
applying a second function further to the add-on setting related control quantity and the rotational speed error to obtain a rotational speed error and add-on setting related control quantity;
applying an add-on setting displacement related control quantity and the rotational speed error and add-on setting related control quantity to a speed-pitch controller which outputs a reference blade pitch angle.

9. The method according to claim 1, wherein the first function and/or the second function and/or the third function comprises at least one of:
a 1D or 2D gain schedule function;
a dead band function.

10. The method according to claim 9, wherein the dead band function comprises a first linear section with positive slope up to a first error value, beyond the first error value a horizontal section up to a second error value, and beyond the second error value a second linear section with positive slope.

11. The method according to claim 9, wherein the gain schedule function comprises a first non-linear section with positive slope up to a first error value and/or that is monotonically increasing up to the first error value, beyond the first error value a horizontal section up to a second error value, and beyond the second error value a second non-linear section with positive slope and/or that is monotonically increasing.

12. The method according to claim 1, wherein the add-on includes a one segment or multi-segment spoiler;
a flap mounted at a tip end of the blade; and/or
a flap mounted at a trailing edge of the blade.

13. The method of claim 1, wherein the add-on utilization factor comprises a constant, a function of turbulence intensity, and/or a function of turbine operation values.

14. An arrangement for controlling a wind turbine by adjusting a blade pitch angle and an add-on of a blade having the add-on, the arrangement comprising:
a control module configured to adjust an add-on setting of the add-on to meet a control objective while temporarily maintaining a setting of the blade pitch angle and adjust the blade pitch angle based on a rotational speed error and an add-on setting displacement, being a difference between a reference add-on setting and/or an actual add-on setting, on the one hand, and a nominal add-on setting, on the other hand, wherein the nominal add-on setting corresponds to: a setting wherein the add-on has an effect of 50% of a total capacity regarding influencing aerodynamic properties of the blade or regarding airflow around the blade and/or a desired setting for normal operation of the wind turbine, a total off-state of the add-on, and/or an add-on set point calculated from an add-on utilization factor;
wherein the blade pitch angle is adjusted only:
when the rotational speed error is larger than a rotational speed error threshold, and/or
when the add-on setting displacement is larger than a displacement threshold, and/or
when the reference add-on setting and/or the actual add-on setting is closer to at least one add-on setting limit than at least one limit threshold.

15. A wind turbine, comprising:
a blade having an add-on installed; and
an arrangement for controlling a wind turbine by adjusting a blade pitch angle and the add-on of the blade, the arrangement including a control module configured to adjust an add-on setting of the add-on to meet a control objective while temporarily maintaining a setting of the blade pitch angle and adjust the blade pitch angle based on a rotational speed error and an add-on setting displacement, being a difference between a reference add-on setting and/or an actual add-on setting, on the one hand, and a nominal add-on setting, on the other hand, wherein the nominal add-on setting corresponds to: a setting wherein the add-on has an effect of 50% of a total capacity regarding influencing aerodynamic properties of the blade or regarding airflow around the blade and/or a desired setting for normal operation of the wind turbine, a total off-state of the add-on, and/or an add-on set point calculated from an add-on utilization factor;
wherein the blade pitch angle is adjusted only: when the rotational speed error is larger than a rotational speed error threshold, when the add-on setting displacement is larger than a displacement threshold, and/or when the reference add-on setting and/or the actual add-on setting is closer to at least one add-on setting limit than at least one limit threshold, wherein the arrangement is coupled to a blade pitch adjustment system and an add-on adjustment system.

* * * * *